United States Patent [19]

Frerich et al.

[11] Patent Number: 4,779,526
[45] Date of Patent: Oct. 25, 1988

[54] MACHINE FOR FORMING CYLINDRICAL BALES OF CROP

[75] Inventors: Josef Frerich, Dietrichingen, Fed. Rep. of Germany; Jean Viaud, Sarrequemines, France

[73] Assignee: Deere & Company, Moline, Ill.

[21] Appl. No.: 138,248

[22] Filed: Dec. 28, 1987

[30] Foreign Application Priority Data

Feb. 2, 1987 [GB] United Kingdom ............... 8702291
Feb. 2, 1987 [GB] United Kingdom ............... 8702292

[51] Int. Cl.⁴ .................. B65B 63/04; B65B 13/20; B30B 3/04
[52] U.S. Cl. .................................. 100/5; 100/6; 100/88; 53/118; 56/341
[58] Field of Search ............... 100/88, 89, 4, 5, 6, 100/13, 15; 53/118; 56/341

[56] References Cited

U.S. PATENT DOCUMENTS

| | | | |
|---|---|---|---|
| 4,366,665 | 1/1983 | Van Ginhoven et al. | 56/341 |
| 4,407,113 | 10/1983 | Core | 56/341 |
| 4,604,855 | 8/1986 | Krone et al. | 53/118 X |
| 4,729,213 | 3/1988 | Raes | 100/88 |

FOREIGN PATENT DOCUMENTS 3322024 8/1984 Fed. Rep. of Germany.
3418681 11/1985 Fed. Rep. of Germany.
2239188 2/1975 France.

Primary Examiner—Peter Feldman

[57] ABSTRACT

A baling machine for forming large cylindrical bales of hay has a variable volume baling chamber defined by moving belts with a crop inlet on the underside of the machine. When a bale has been completed it is wrapped with surface wrapping material stored in a holder on the back of the baler. The wrapping material is advanced by feed rolls through a cutting mechanism below the holder, and is thus guided by a plate extending along the underside of a run of the belts to the baling chamber. In order to avoid wasting wrap, a cutter is triggered by a peg carried by a metering wheel movable between an adjustable "home" position against an abutment or stop to a trigger position in which it engages and lifts a release lever to release the cutter, and this distance is a measure of the length of wrap material required for the completed bale. In respective embodiments, the metering wheel is in the form of a friction wheel, a worm wheel and a ratchet wheel with all wheels being selectively driven by one of the feed rolls.

15 Claims, 5 Drawing Sheets

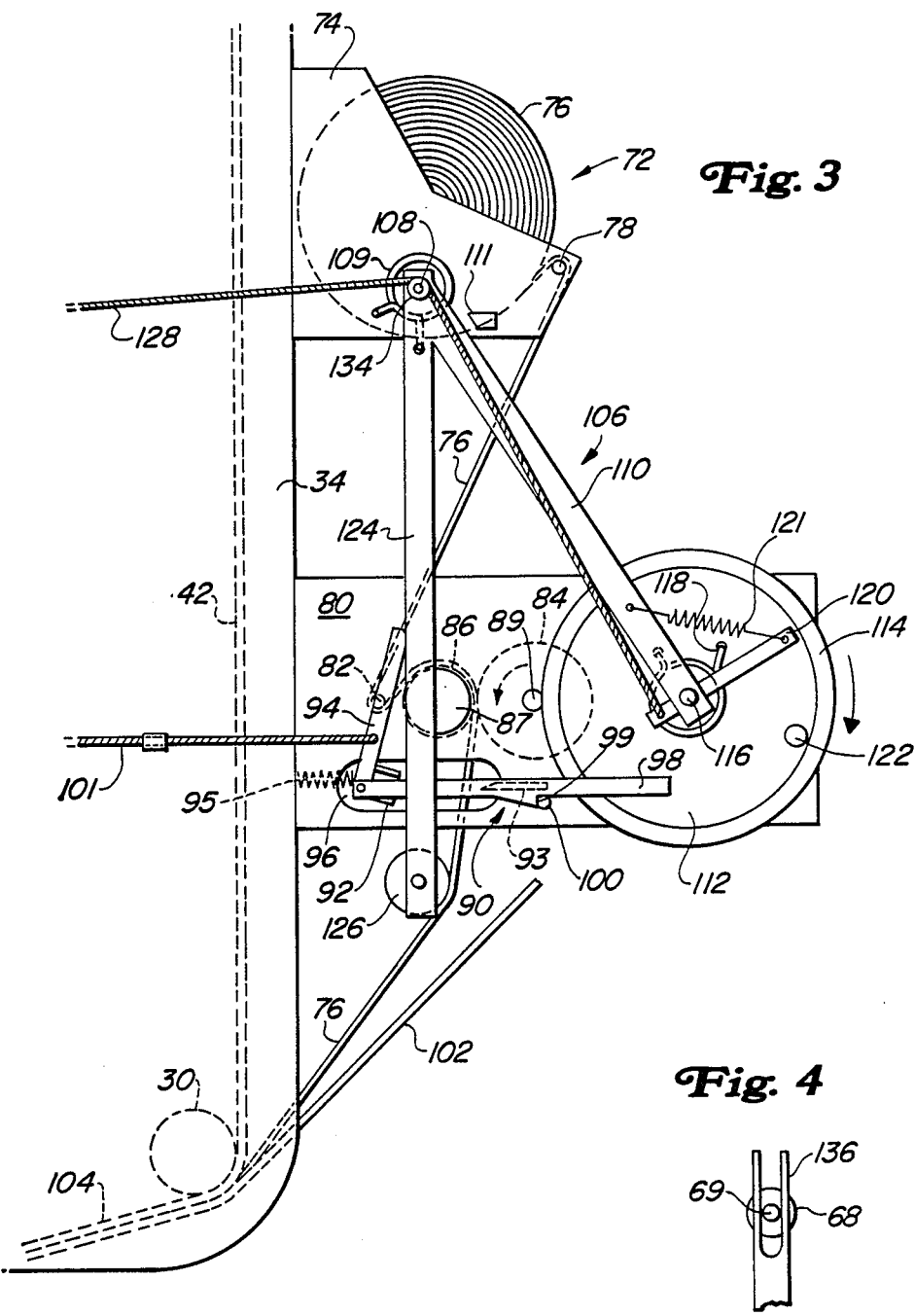

MACHINE FOR FORMING CYLINDRICAL BALES OF CROP

BACKGROUND OF THE INVENTION

The present invention relates to a baling machine for forming cylindrical bales of crop.

Machines, towed by a tractor, for forming large cylindrical bales of hay (so called "round balers") are well-known. As the machine advances, the crop is removed from a windrow by a pick-up mechanism and delivered rearwardly to a baling chamber where it is rolled into a bale.

In one basic widely known form of such machines, the baling chamber is defined by runs of driven belts which move outwardly to enlarge the chamber to accommodate the bale as it grows in size. The hay is caused to roll round upon itself into a core and the core rotates about its horizontal axis and finally a completed bale is formed, the chamber being fed throughout with hay. The fully formed bale is tied with twine to maintain its shape and is discharged through a gate formed by a rear portion of the machine.

In our commonly assigned, co-pending U.S. patent application Ser. No. 020,417 filed Mar. 2, 1987 we have described and claimed a machine which enables bales produced in such a chamber to be wrapped with a surface wrap such as net to maintain their shape.

In commonly assigned U.S. Pat. No. 4,677,807 issued July 7, 1987, there is described a twine tie baler, as described above, which has a surface wrap mechanism so embodied therein that the automatic twine tie initiating portion of the twine tie mechanism is used to automatically initiate operation of the surface wrap mechanism in response to bale size and to apply a desired amount of surface wrap to the bale. This function of the patented device is desirable because it enables one to vary the amount of wrap applied in accordance with the size of the bale being wrapped and thus avoid wasting wrapping material. However, the mechanism for achieving this is rather complicated.

The present invention enables such wastage of wrap to be reduced or avoided by use of relatively uncomplicated wrapping material metering devices.

SUMMARY OF THE INVENTION

According to the present invention a baling machine for forming cylindrical bales of crop has a variable volume baling chamber which is defined in part by belts supported on rolls carried in part by a fixed frame and in part by a vertically swingable discharge gate, feed rolls for advancing wrapping material for the completed bale, and a cutting mechanism for the wrapping material downstream of the feed rolls, the cutting mechanism being arranged to be triggered to cut the wrapping material in a length dependent on the size of each completed bale.

An object of the invention is to provide a baler having an expansible baling chamber with a mechanism for applying a predetermined amount of surface wrapping material to a bale of a given diameter, such predetermined amount being effected by operation of a metering wheel carrying a lift peg operable for triggering the wrapping material cutting mechanism.

Another object, relating to a first embodiment of the invention, is to provide a metering wheel so controlled by a known belt take-up and tensioning mechanism that the cutting mechanism is triggered in dependence on the position of an element of the tensioning mechanism which moves in accordance with bale growth within the bale chamber.

A further object, relating to second and third embodiments of the invention, is to provide a metering wheel which is driven by a wrapping material feed roll through a predetermined distance, corresponding to a desired length of wrapping material being dispensed into the bale chamber, before triggering the cutting mechanism.

Yet another object of the invention is to provide in conjunction with metering wheels, as afore-described, means for automatically resetting the metering wheels back to their home position once the cutting mechanism has been triggered.

A more specific object is to provide metering wheels which are biased toward their home position and are permitted to return to their home position by disconnecting the drive thereto.

These and other objects, features and advantages of the present invention will become apparent to those skilled in the art from the description which follows and from the drawings.

BRIEF DESCRIPTION OF THE DRAWINGS

FIG. 3 is an enlarged view of the wrapping apparatus of FIG. 1, shown during wrapping as in FIG. 1.

FIG. 4 is a view along line 4—4 of FIG. 2 showing a detail of the bale diameter sensor.

DESCRIPTION OF THE PREFERRED EMBODIMENT

Figure 1:
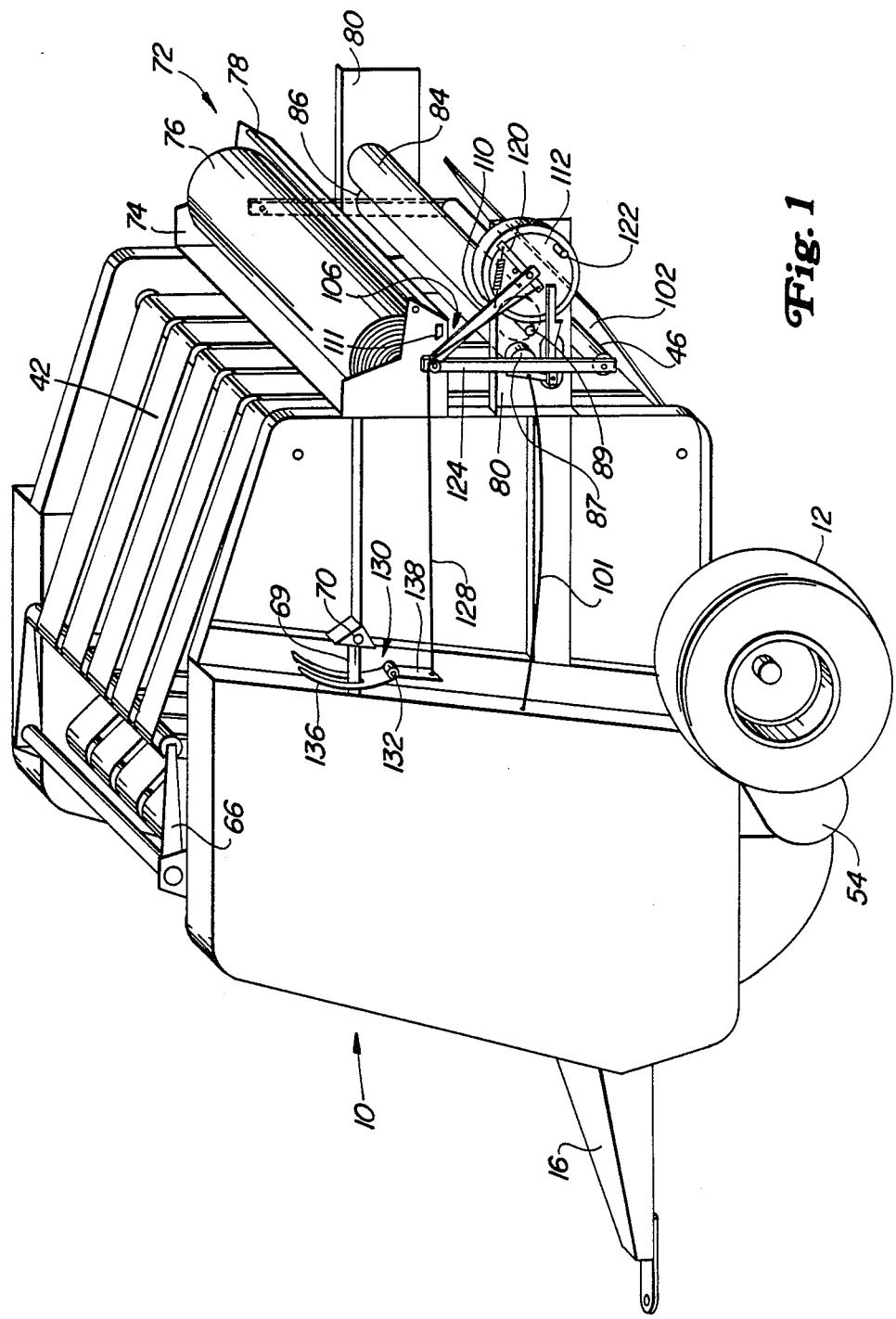
FIG. 1 is a perspective view of the left hand side and rear of a machine of the present invention for forming large cylindrical bales of hay (with some items omitted) including apparatus for wrapping a completed bale with net, shown during wrapping.

Referring to FIGS. 1-4, the baler includes a main frame 10 mounted on a pair of wheels 12. The main frame has an upright fore-and-aft extending wall 14 on either side connected by transverse beams (not shown). A draft tongue 16 is connected to a transverse beam at the front of the frame 10 and extends forwardly for attaching the baler to a tractor (also not shown) which draws the machine.

A plurality of lateral rolls extends over the width of the machine. One set of rolls 18, 20, 22, 24, 26 is journalled in the sidewalls 14 while another set consisting of rolls 28, 30 32 is journalled in a swingable gate 34. There is also a pair of chamber restricting rolls 36, 38 and two belt take-up rolls 40, 41.

Figure 2:
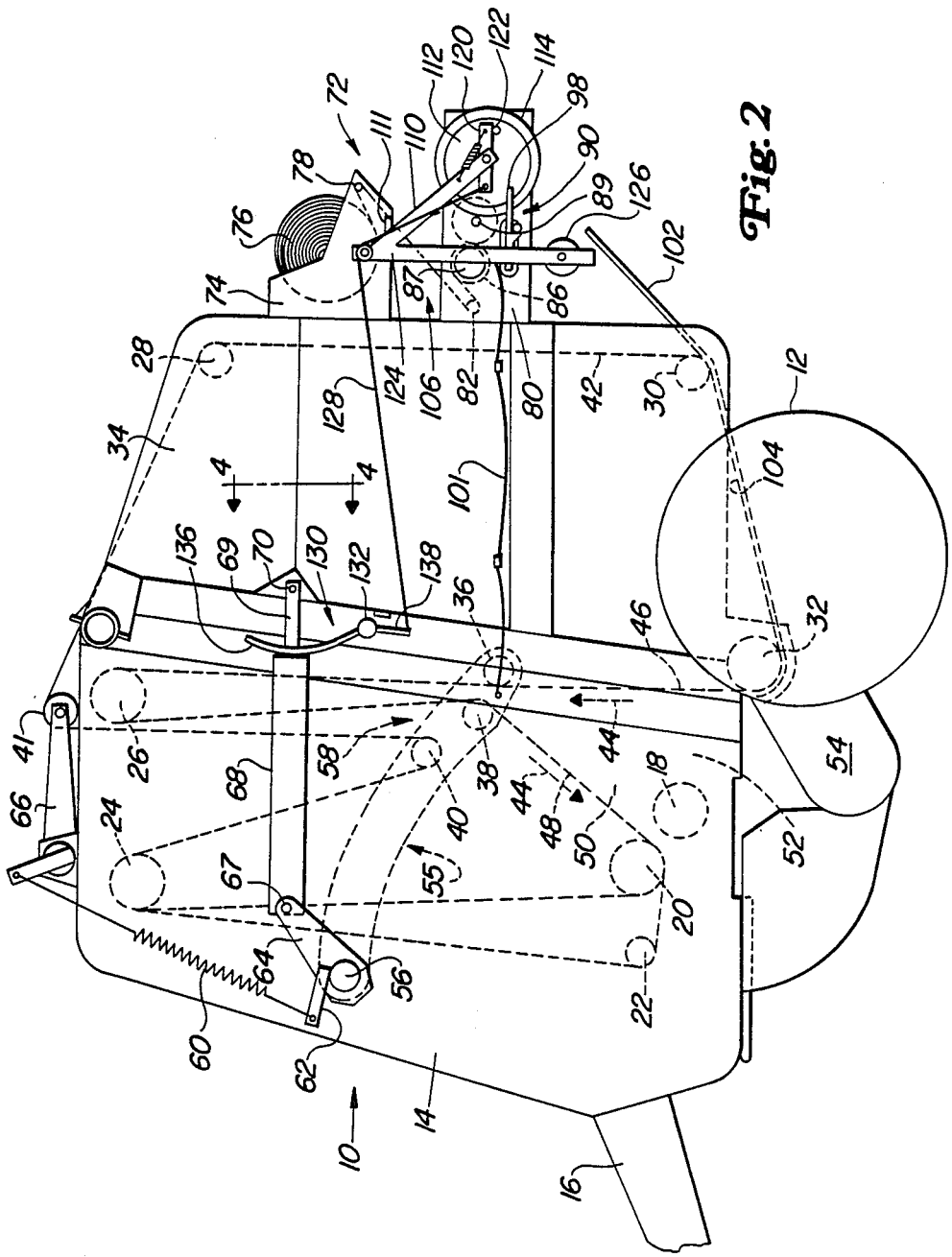
FIG. 2 is a view of the machine from the left showing details within the machine, shown during baling.

Six rubber belts 42 are trained side-by-side over the rolls, with the exception of the roll 18 which acts as a stripper roll, to provide the configuration shown and they move in the direction indicated by arrows 44, the stripper roll 18 being driven clockwise as viewed in FIG. 2. However, alternate belts only are trained over the lower foremost roll 22, while the remaining belts bypass this roll, to provide a staggered array which is of no significance in relation to the present invention but which is described in U.S. Pat. No. 4,399,746 granted Aug. 23, 1983. Upwardly extending runs 46, 48 of the belts 42 define a bale-forming chamber 50 the ends of which are provided by the sidewalls 14 and gate 34 and which has an inlet 52 for crop received from a pickup 54 beneath it.

In order to accommodate the increasing diameter of a growing bale core in the bale-forming chamber 50, the size of the chamber must also increase and a belt take-up and tensioning mechanism 55 is provided at either side of the machine. These mechanisms include: a pair of rearwardly extending idler arms which are mounted rigidly at the forward end of the main frame 10 on a horizontal transverse shaft 56, providing a pivot connection for the arms, and of which the left-hand arm 58 only is shown; the belt take-up roll 40 is supported at either end at an intermediate location on the arms 58; and the pair of chamber restricting rolls 36, 38 are supported at the free ends of the arms The arms are biased in a clockwise direction (in FIG. 2) by a pair of springs, one on either side of the main frame 10, of which only the left hand spring 60 is shown and only its arrangement will be described, the other being similar. The spring 60 is connected at its lower end by a post 62 to a lever portion 64 of the arm 58, the portion 64 being rigid with the pivot shaft 56, and at its upper end to one arm of a bell crank 66 the other arm of which bears one end of the take-up roll 41. The free end of the lever portion 64 is pivotally connected at a point 67 to the cylinder of a piston and cylinder unit 68, loading the arm 58, of which the piston rod 69 is in turn pivotally connected to the gate 34 at a point 70, a similar arrangement being provided also on the right hand side of the machine (although it is possible to use a single unit 68 only). Thus the piston and cylinder unit 68 also forms part of the belt take-up and tensioning mechanism 55.

As described thus far the baler is conventional.

On the back of the gate 34 and below it, there is mounted a bale wrapping apparatus 72 for wrapping a completed bale with a surface wrap such as plastic sheet or net, which serves to maintain the form of the cylindrical bale. This apparatus 72 includes a trough-shaped holder 74 extending across the width of the gate 34 and containing a supply roll of surface wrap 76. An idler roll 78 is disposed along the outlet of the holder 74 and a length of the surface wrap emanating from the roll is trained over it. A pair of brackets 80 is arranged below the holder 74 and the brackets carry between them a further idler roll 82 and a pair of side-by-side feed rolls 84, 86 of which the roll 86 is driven by an electric or hydraulic motor 87. The roll 84 is supported by a shaft 89 rigid therewith which projects outwardly beyond the associated bracket 80. The wrap 76 passes over the idler roll 82 and through the nip of the feed rolls 84, 86 by which it is gripped.

A cutting mechanism 90 is mounted on the brackets 80 below the feed rolls 84, 86 to receive the net 76 therefrom and includes, as can best be seen in FIG. 3, a hammer 92 on the gate side of the wrap and a horizontal knife 93 on the other side of the wrap. The hammer 92 is pivotally mounted on the brackets 80 by upwardly extending posts 94 and loaded by a spring 95 toward the knife 93. Its ends are received in a slot 96 in each bracket 80 and are pivotally connected to a horizontal release lever 98 on the outward face of each bracket, the release lever having a shoulder 99 on its underside in contact with an abutment pin 100. A reset cable 101 is connected between the post 94 and the wall 14. The cable 101 is slack when the gate 34 is closed but becomes taut and transmits motion of the gate to reset the release lever 98 when the gate pivots upwardly to discharge a wrapped bale.

Below the brackets 80 there is a guide plate 102 which slopes forwardly and downwardly, and extends in close proximity to the underside of a run 104 of the belts 42 extending between the rolls 30 and 32, finally terminating in an upturned end portion which follows the path of the belts about the roll 32 to the inlet 52 of the baling chamber 50. The guide plate 102 is positioned to receive surface wrap which has passed through the cutting mechanism 90 and to press the surface wrap against the belt run 104 to advance it.

A first mechanism (FIGS. 1-4) for freeing the release lever 98 will now be described. On the left side of the machine a bell crank lever 106 is swingably suspended from a pivot pin 108 projecting from an outer face of the holder 74 and is lightly spring loaded, by a torsion spring 109 arranged about the pin 108, in an anticlockwise direction toward an abutment 111 on the holder. One arm 110 of the bell crank extends rearwardly carrying at its lower end a metering wheel 112 in the form of a friction wheel provided with a rubber facing 114 and which can turn on a stub shaft 116 mounted to the bracket 80. Movement of the wheel 112 in the clockwise direction (as viewed in the Figures) is opposed by a torsion spring 118 (FIG. 3) arranged about the shaft 116. The shaft 116 also carries an adjustable stop in the form of an abutment arm 120 which has an intermediate location pivotally received on the shaft with a longer portion of the arm extending radially from the shaft almost to the periphery of the wheel 112 and with a shorter portion of the arm extending radially from the shaft 116 just a short distance The arm 120 is loaded by a spring 121, connected between the arm and the bell crank lever 106, against turning in a clockwise direction. A travelling member in the form of a release peg 122 or other abutment projects from the outward side of the metering wheel 112 and is located against the underside of the abutment arm 120 in a "home" position during baling (FIG. 2) and can move from this position to contact the underside of the release lever 98 on clockwise movement of the wheel 112 during wrapping (FIGS. 1 and 3). The remaining arm 124 of the bell crank lever 106 carries at its lower end an idler roll 126 which extends across the machine and over which the surface wrap 76 is trained on being fed to the bale-forming chamber 50.

A draw line in the form of a cable 128 is connected between the shorter portion of the abutment arm 120 and a bale diameter sensor 130 mounted for swinging movement about a pivot pin 132 on the gate 34. En route the cable passes over a pulley 134 on the pivot pin 108. The sensor 130 has an upper portion 136 which is forked to receive the piston rod 69, as can be seen in FIG. 4, the fork permitting free movement of the rod both along and through the fork, and a lower portion 138 rigid therewith to the lower end of which the cable 128 is attached. Due to the spring loading of the abutment arm 120, the sensor 130 will be held by the pull of the cable 128 in continuous contact with the rearward end of the cylinder of the piston and cylinder unit 68 on the left side of the machine, and therefore "senses" its movement and hence the extent of expansion of the unit which in turn is dependent on the position of the idler arm 58 and thus on bale size. Sensing the position of the idler arm 58 indirectly by way of the piston and cylinder unit 68 avoids direct attachment of the cable to the arm and the consequen routing of the cable too near the pivot of the gate 34 when the latter is open.

Although the mechanism for freeing the release lever 98 has been described above as having a single bell crank lever 106 connected to a sensor 130 on one side only of the machine, it is possible to use in addition a further bell crank lever in conjunction with a further sensor on the other side.

In operation, hay lying in a windrow is lifted and conveyed to the baling chamber 50 where the oppositely moving runs 46, 48 of the belts 42 cause the crop to turn anticlockwise (as viewed in FIG. 2) so as to form a bale core of increasing size which eventually overcomes the tension in the belts brought about by the belt take-up and tensioning mechanisms, and the idler arms 58 consequently swing upwardly, the piston and cylinder units 68 expanding, and thus the chamber 50 increases in size until a full-sized bale has been formed. The operation of baling so far described is conventional.

The bale is then wrapped with surface wrap using the apparatus 72. With crop still being fed to the baling chamber 50 and the bale still rotating, the motor 87 for the feed roll 86 is triggered, by means of a switch (not shown) which is sensitive to a predetermined position of the idler arms 58 corresponding to the required full-size bale, to drive the feed roll 86 and hence to advance the surface wrap 76 of which the end is, at this stage, level with the knife 93. The wrap is propelled to the guide plate 102, slides along the plate and reaches the bite between the roll 30 and belts 42 on the one hand and the plate 102 on the other where it is gripped and further advanced by the belt run 104, tracking at the same time over the roll 126. Finally the wrap 76 reaches the upturned end portion of the plate 102 and thus enters the baling chamber 50 where it is carried round with the bale.

When three quarters of the circumference of the bale has been wrapped by the wrap, the flow of hay to the baling chamber is stopped This can be brought about, for example, by an electrically operated dog clutch (not shown) triggered automatically by a counter meter and connected in a drive line to the pickup 54, only the pickup being stopped.

By the completion of wrapping it is desirable to have two full turns of wrap on the bale s that there is entire overlap of the wrap, but at the same time to avoid wastage due to having excess wrap. Wrapping is continued after shut-off of the pickup 54 until such time as the length of wrap downstream of the cutting mechanism 90 measures twice the circumference of the bale. This is metered as follows.

During the period that the bale is being formed, as it grows in size and the idler arms 58 swing upwardly, the sensor 130 will turn in an anticlockwise direction allowing the abutment arm 120 via the cable 128 also to swing in an anticlockwise manner under the influence of its spring loading. This movement is in turn followed by that of the release peg 122 which maintains contact with the swinging abutment arm 120 as the wheel 112 is also permitted to turn anticlockwise under its spring loading 118. Thus the release peg 122 continuously assumes a "home" position which is related to the size of the bale.

When the wrap 76 tracks over the roll 126 and is drawn into the baling chamber 50 as mentioned above, it will swing the bell crank lever 106 clockwise a short distance against its lgght spring loading until the rubber facing 114 of the metering wheel 112 contacts the shaft 89 which is turning with the feed roll 84. Thus the wheel 112 is driven clockwise against the spring loading 118 and the peg 122 moves under the lever 98, raises it, and thereby releases it from the abutment pin 100, whereupon the hammer 92 thrusts the wrap 76 against the associated knife 93 and the wrap is severed. At the same time the hammer 92 triggers cut-off of the feed roll motor. The pull on the bell crank lever 106 by the wrap 76 ceases and the wheel 112 moves out of contact with the shaft 89 as the lever 106 swings back into contact with the abutment 111. The spring 118 will then turn the wheel 112 anticlockwise and reset the peg 122 in its home position against the abutment arm 120.

After severance of the wrap 76 the bale continues to turn and the remainder of the cut wrap is drawn into the chamber 50 to wrap round the bale to complete the double wrap. The belts 42 are stopped, the gate 34 raised by the cylinder units 68, and the wrapped bale is deposited on the ground. Opening of the gate 34 tightens the reset cable 101 and then transfers gate motion thereto to return the release lever 98 to its latched position to thus reset the hammer 92. The gate 34 is closed and baling can start once more.

Clearly the distance travelled by the peg 122 from its "home" position of contact with the abutment arm 120 to its position at which it releases the hammer 92 determines the length of the wrap 76 which is cut by the knife 93. Since this distance depends on the position of the idler arm 58 (i.e., on the size of bale) as determined by the sensor 130, the amount of wrap used in wrapping a bale can be controlled precisely to avoid unnecessary wastage so that the desired appropriate amount of wrap is employed for each bale automatically regardless of the size of the completed bale in this variable volume baling chamber machine. If any readjustment is needed from time-to-time, this can be done by shortening or lengthening the cable 128 at its connection with the sensor 130.

Referring now to the alternate arrangements respectively shown in FIGS. 5 and 6 for freeing the release lever 98, that arrangement in FIG. 5 will be described first, with structure like that already described being given a like reference numeral A worm gear 150 is mounted horizontally by a support 152 on the outer face of the left hand bracket 80, and is driven by the roll 84 via a bevel gear 154 mounted on the end of the roll and meshed with a bevel gear 156 on the worm gear 150. Alternatively the bevel gear 154 can be driven directly by the motor for the roll 86. In turn the worm gear 150 is in mesh (in the position shown in FIG. 5) with a metering wheel 158 in the form of a worm wheel located below it and mounted at the lower end of an arm 160 which is swingable about a pivot pin 162 at its upper end and which is spring loaded, as by a torsion spring 164 arranged about the pivot 162, toward the mesh position. The metering wheel 158 itself is also spring loaded by the torsion spring 118 for anticlockwise movement. A lift peg 166, having a function similar to that of the lift peg 122 (FIG. 3), is mounted on this metering wheel 158 so that it projects from both faces thereof. The lift peg 166 is disposed so that it can move from an inoperative (or "home") position against a stop 167 adjustably fixed along a slot provided in the bracket 80. The reset cable 101 is attached at one end to an intermediate point 170 on the arm 160 and at the other end to a fixed location on the left-hand sidewall 14. A branch of the cable also runs to the left-hand post 94. In the position (in FIG. 5) in which the gate 34 is closed, the cable 101 is slack and does not affect the disposition of the arm 160 and the post 94.

The corresponding arrangement for freeing the release lever 98 in the FIG. 6 embodiment will now be described Here the lift peg 166 is on a metering wheel 171 in the form of a ratchet wheel mounted on the stub shaft 116 on the outer face of the left-hand bracket 80 and driven by the roll 84 by a pawl device 172. This latter consists of: a crank arm 174 extending from the roll; a link 176 pivotally connected at one end to the arm 174; an upwardly extending pawl arm 178 pivotally connected at its upper end to the other end of the link 176 and mounted at its lower end on the stub shaft 116; an advancing pawl 180, on the arm 178, which engages an upper portion of the ratchet teeth on the metering wheel 170; and a free swinging holding or locking pawl 182 which is mounted on the bracket 80 and which also engages the ratchet teeth of the wheel 170. The metering wheel 170 is loaded by the torsion spring 118, connected between the wheel and the arm 178 to bias the wheel in an anticlockwise direction (as viewed in FIG. 6). The cable 101 is connected in this embodiment to the left-hand post 94 and also to the pawls 180 and 182 of the pawl device 172.

Figure 5:
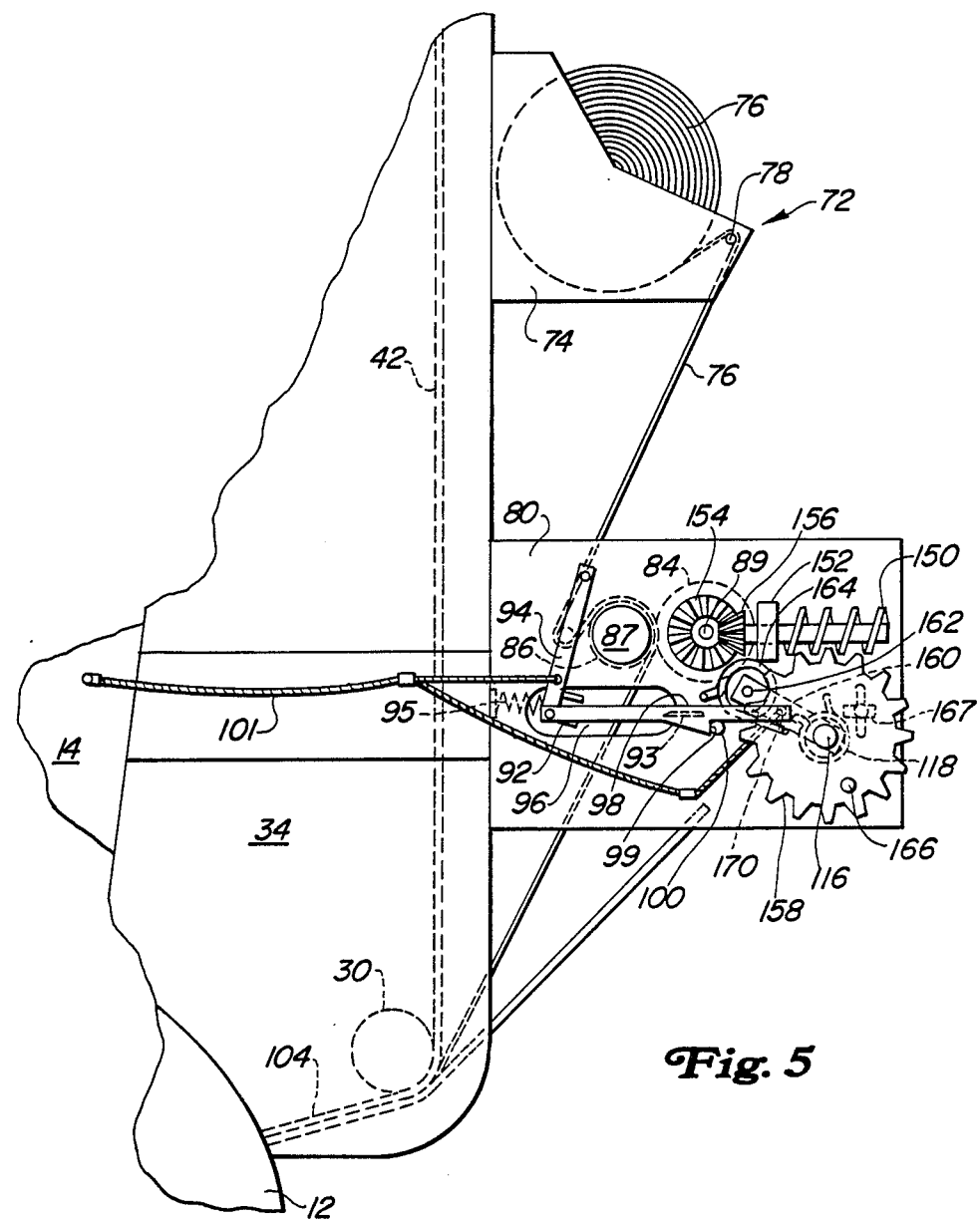
FIG. 5 is a view like FIG. 3 but showing a first alternate mechanism for triggering the cutting mechanism.
Figure 6:
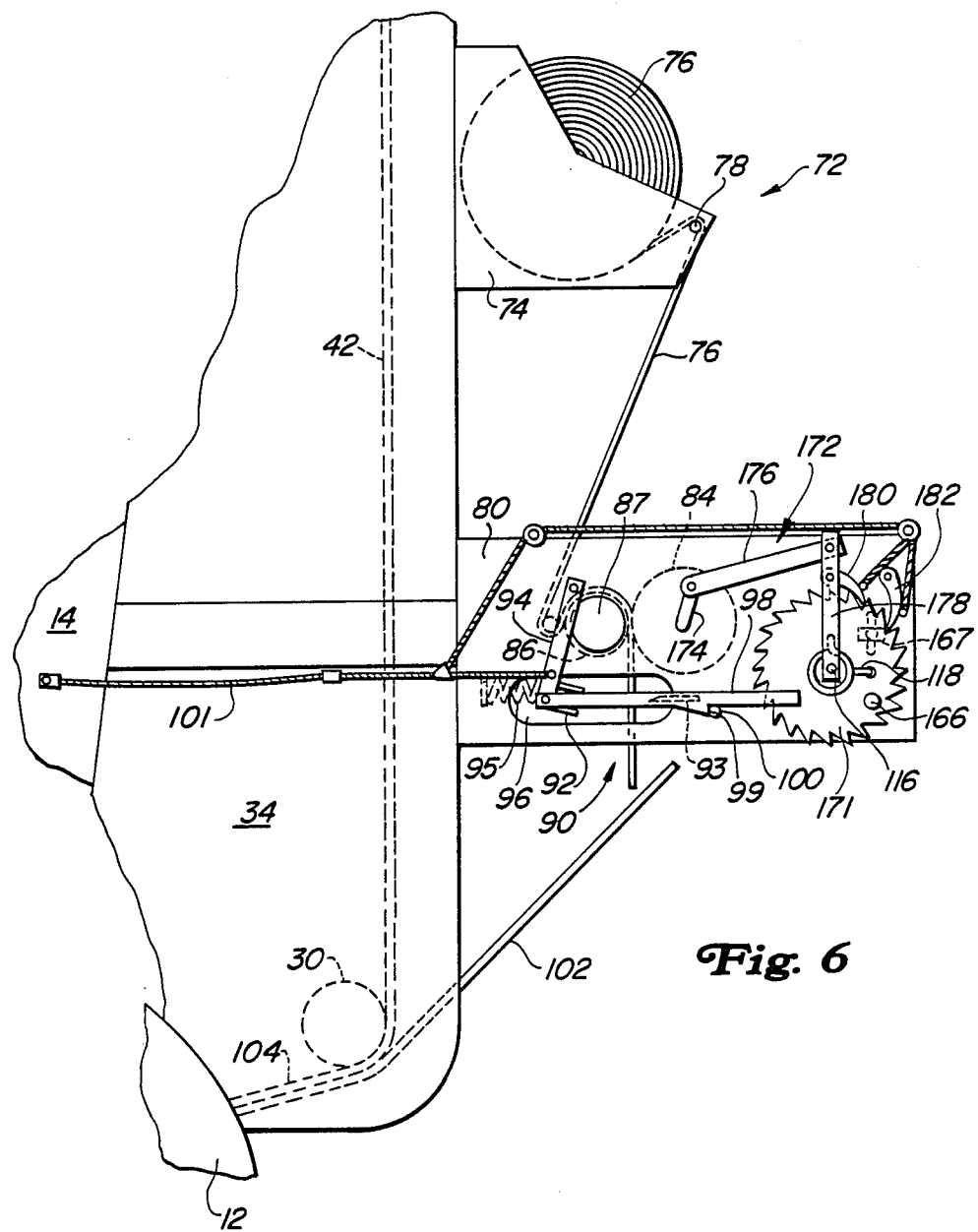
FIG. 6 is a view like FIG. 3 but showing a second alternate mechanism for triggering the cutting mechanism.

In operation, the embodiments of FIGS. 5 and 6 operate exactly like the afore-described first embodiment of FIGS. 1–4 except for the manner in which the surface wrap 76 is metered to ensure that a length downstream from the cutting mechanism 90 is severed when it measures about twice the circumference of the bale being wrapped.

Turning firstly to the wrapping apparatus of FIG. 5, when the motor for the feed rolls 84, 86 is triggered to operate as described above, the worm gear 150, and hence the metering wheel 158, will be driven by the roll 84 thereby causing the lift peg 166 to move from its inoperative position. The anticlockwise revolutions of the roll 84 translate into much reduced clockwise turning motion of the wheel 158 (against its spring loading) arranged such that the lift peg 166 reaches its operative lifting position in contact with the underside of the release lever 98 at precisely the time that two full turns of wrap 76 have been advanced from the feed rolls 84, 86. The peg 166 lifts the release lever 98 free of the abutment pin 100 and instantly the hammer 92 is impelled by the action of the spring 95 toward the knife 93 thereby cutting the wrap 76 therebetween. At the same time the hammer 92 triggers cut-off of the feed rll motor.

The bale continues to turn and the remainder of the cut length of wrap is drawn into the chamber 50 to wrap round the bale to complete the double wrap. The belts 42 are stopped, the gate 34 raised by the cylinder units 68, and the wrapped bale is deposited on the ground. Opening of the gate 34 results in the cable 101 becoming taut and then pulling the arm 160 and the post 94, to which it is connected, in a frontward direction. The effect of this is to reset the release lever 98 into abutment with the pin 100 and to disengage the metering wheel 158 from meshing with the worm gear 150. Once thus free, the metering wheel 158 turns under its spring loading in an anticlockwise direction and thus the lift peg 166 is returned from its operative to its inoperative position where it comes into abutment with the adjustable stop 167 against further anticlockwise movement. Since the distance between the adjustable stop 167 and the underside of the release lever 98, which is travelled by the lift peg 166 is a measure of the length of wrap advanced for wrapping a completed bale, it is simple to allow for different sizes of bale by adjusting the position of the stop 167 in accordance with bale size.

The gate 34 is closed and baling can start once more.

Now turning to the operation of the wrapping apparatus of FIG. 5, when the motor for the feed roll 86 is triggered to function, the metering wheel 171 will be driven clockwise by the pawl device 172, the advancing pawl 180 serving to turn the wheel and the free swinging locking pawl 182 acting to hold the wheel against its spring loading 118 as the pawl 180 moves from tooth to tooth on the wheel. The lift peg 166 acts in the same manner as already described in relation to FIGS. 3 and 5 and the wrap 76 is cut.

The bale continues to turn and the remainder of the cut length of wrap is drawn into the chamber 50 to wrap round the bale to complete the double wrap. The belts 42 are stopped, the gate 34 raised by the cylinder units 68 and the wrapped bale is deposited on the ground. Opening of the gate 34 results in the cable 101 becoming taut and then pulling the post 94 in a frontward direction to reset the release lever 98 into abutment with the pin 100 and pulling the pawls 180 and 182 upwardly to disengage them from the ratchet teeth of metering wheel 136. Once the pawls 180, 182 are raised out of engagement with the metering wheel 136, the wheel is enabled to turn freely anticlockwise under the influence of the spring 118 to reset the lift peg 186 in its "home" position against the stop 167. Closing of the gate 34 results in the cable 101 going slack thus permitting the pawls 180, 182 to gravitate into engagement with the ratchet teeth of the metering wheel 136 and the operation is then ready to start again.

We claim:

1. In a combination including a bale-forming chamber defined in part by a plurality of belts carried in part by a vertically swingable discharge gate and in part by a fixed frame and being expansible, in response to bale growth therewithin, against the bias of a tensioning mechanism including an element which moves in response to bale growth within the chamber; and a wrap dispensing mechanism mounted exteriorly of the chamber for introducing wrap thereinto and including a holder for a roll of bale surface wrapping material, a pair of feed rolls supported adjacent the holder and oriented for receiving wrapping material therebetween and discharging the same along a path extending tangentially to the feed rolls, a motor coupled to one of the feed rolls, a cutting mechanism located downstream from the feed rolls and including a knife and a hammer located on opposite sides of the path, with the knife being fixed and the hammer being carried by a pair of pivotally anchored posts arranged for guiding the hammer to and from engagement with the blade, hammer biasing means loading the hammer towards the knife and a release lever pivotally connected to one of the posts and including a catch surface normally engaging an abutment for holding the lever in a latched position wherein it holds the hammer in spaced relation to the knife, the improvement comprising: a wrap metering mechanism including a metering wheel rotatably mounted at a location beside the release lever; a stop located beside the wheel at a location spaced from the release lever; a lift peg projecting from and being movable with the wheel between a home position, wherein the peg is positioned against the stop, and an actuated position wherein the peg has engaged and lifted the release lever from said abutment; wheel biasing means urging the wheel towards said home position; wheel drive means releasably coupled between one of the feed rolls and the metering wheel for rotating the latter from its home to its actuated position in response to rotation of said one of the feed rolls: drive disconnect means for automatically disconnecting the drive means from the wheel once the wheel moves to its actuated position to thereby permit the wheel biasing means to return the wheel to its home position; and hammer reset means coupled to the release lever for automatically moving it to its latched position once a bale is wrapped.

2. The combination defined in claim 1 wherein said wheel drive means includes a shaft coupled for rotation with said one of the feed rolls; said wheel being in the form of a friction wheel having a smooth periphery and a wheel support means carrying said metering wheel and being operable for selectively frictionally engaging the periphery of the metering wheel with the shaft.

3. The combination defined in claim 2 wherein the periphery of the wheel is defined by an annular layer of high friction elastomer.

4. The combination defined in claim 2 wherein the wheel support means includes a wheel support structure mounted for pivoting about a horizontal axis between drive disengage and engage positions respectively wherein the wheel is spaced from and frictionally engaged with said shaft; wheel support biasing means urging the wheel support structure towards its drive disengage position; and a roll rotatably mounted on the wheel support structure at a location downstream of the cutting mechanism and engageable by a length of wrap extending between the bale-forming chamber and the feed rolls whereby the wheel support structure is held in its drive engage position anytime such length of wrap is present.

5. The combination defined in claim 1 wherein said stop is mounted for adjustment relative to said metering wheel; and a bale diameter sensing means coupled between the movable element of said tensioning mechanism and said stop for moving the stop in a direction away from said release lever in response to movement of the element in response to bale diameter growth.

6. The combination defined in claim 5 wherein said stop is in the form of an abutment arm pivotally mounted coaxially with the metering wheel; arm biasing means coupled to the arm and biasing the latter in a direction away from the release lever; and said diameter sensing means including a cable coupled to said abutment arm and which acts to permit the arm biasing means to pivot the arm increasingly away from the release lever in response to bale growth.

7. The combination defined in claim 6 wherein the movable element is a cylinder of a hydraulic actuator and said bale diameter sensing means includes a follower member pivotally mounted for movement about a second horizontal axis and having one end engaged with an end of the cylinder and another end coupled to said cable.

8. The combination defined in claim 7 wherein said one end of the follower member is forked and straddles a rod of the hydraulic actuator.

9. The combination defined in claim 1 wherein said wheel drive means includes a first bevel gear coupled for rotation with said one of the feed rolls; a second bevel gear meshed with the first bevel gear and fixed to one end of a rotatably mounted shaft carrying a worm gear; said metering wheel being in the form of a worm wheel; wheel support means carrying said metering wheel and being operable for selectively placing the wheel in meshing relationship with the worm gear.

10. The combination defined in claim 9 wherein said wheel support means includes a wheel support structure mounted for pivoting about a horizontal axis between drive disengage and engage positions respectively wherein the wheel is spaced from and meshed with said worm gear; wheel support biasing means urging the wheel support structure towards its drive engage position.

11. The combination defined in claim 10 wherein the drive disconnect means and the hammer reset means are formed by a cooperating actuator means for simultaneously resetting the hammer and disconnecting the wheel from the worm gear so as to permit the metering wheel to return to its home position.

12. The combination defined in claim 11 wherein said wrap dispensing mechanism is mounted on the gate and said cooperating actuator means includes a cable coupled between the fixed frame and the hammer support post and the wheel support structure, said cable being of such length that it is slack when the gate is closed but becomes taut and transmits gate motion to the post and wheel support structure when th gate opens.

13. The combination defined in claim 1 wherein said wheel drive means includes an indexing pawl means including an advancing pawl coupled for being driven by said one of the feed rolls and a locking pawl; said metering wheel being in the form of a ratchet wheel engaged by said advancing and locking pawls.

14. The combination defined in claim 13 wherein the drive disconnect means and the hammer reset means are formed by a cooperating actuator means for simultaneously resetting the hammer and disconnecting the wheel from the pawl means so as to permit the metering wheel to return to its home position.

15. The combination defined in claims 9 or 13 wherein said stop is located on a side of the metering wheel opposite to that adjacent the hammer release lever; and said lift peg extends through the metering wheel.

* * * * *